US012294169B2

(12) United States Patent
Lee et al.

(10) Patent No.: US 12,294,169 B2
(45) Date of Patent: May 6, 2025

(54) POWER CONNECTOR SYSTEM HAVING A RIGHT-ANGLE TYPE PLUG CONNECTOR OR A STRAIGHT TYPE PLUG CONNECTOR ENGAGEABLE WITH A HEADER CONNECTOR

(71) Applicant: J.S.T. CORPORATION, Farmington Hills, MI (US)

(72) Inventors: Sen Ming Lee, Singapore (SG); Pei Woon Choo, Singapore (SG)

(73) Assignee: J.S.T. CORPORATION, Farmington Hills, MI (US)

( * ) Notice: Subject to any disclaimer, the term of this patent is extended or adjusted under 35 U.S.C. 154(b) by 417 days.

(21) Appl. No.: 17/827,621

(22) Filed: May 27, 2022

(65) Prior Publication Data

US 2023/0246369 A1 Aug. 3, 2023

Related U.S. Application Data

(60) Provisional application No. 63/304,491, filed on Jan. 28, 2022.

(51) Int. Cl.
*H01R 13/05* (2006.01)
*H01R 13/11* (2006.01)
(Continued)

(52) U.S. Cl.
CPC ........... *H01R 13/05* (2013.01); *H01R 13/113* (2013.01); *H01R 13/193* (2013.01); *H01R 24/28* (2013.01)

(58) Field of Classification Search
CPC ....... H01R 13/05; H01R 13/113; H01R 24/28
(Continued)

(56) References Cited

U.S. PATENT DOCUMENTS 6,416,340 B2 * 7/2002 Schaefer .............. H01R 13/187 439/224
6,692,316 B2 * 2/2004 Hsieh ................. H01R 13/5205 439/224
(Continued)

FOREIGN PATENT DOCUMENTS

CN 109565128 A * 4/2019 ........... H01R 13/112
CN 111541083 A 8/2020
(Continued)

OTHER PUBLICATIONS

International Search Report for International Application No. PCT/US2022/031648 dated Sep. 23, 2022 (3 sheets).

*Primary Examiner* — Peter G Leigh
(74) *Attorney, Agent, or Firm* — Kratz, Quintos & Hanson, LLP

(57) ABSTRACT

A power connector system having a right-angle type plug connector or a straight type plug connector engageable with a header connector. The right-angle type plug connector is a plug connector having a mating direction, which is 90 degrees from the centerline of the cables exiting from the plug connector. The straight type plug connector is a plug connector having a mating direction, which is parallel to the centerline of the cables exiting the back of the plug connector. The header connector holds at least a female receiving terminal or receptacle made of a high electrical conductivity material. The female receiving terminal or receptacle includes fingers that extend parallel to each other, and are spaced apart from each other, and further includes a reinforcing spring member. The plug connector holds at least a male rectangular tab terminal, the male rectangular tab terminal having a short edge and a long edge. The female receiving terminal of the header connector may mate with either the short edge or the long edge of the male rectangular tab terminal of the plug connector. The other end of the male rectangular tab terminal includes a wire or a cable attached thereto via welding, mechanical crimp, or the like.

20 Claims, 10 Drawing Sheets

(51) Int. Cl.
*H01R 13/193* (2006.01)
*H01R 24/28* (2011.01)

(58) Field of Classification Search
USPC .......................................................... 439/825
See application file for complete search history.

(56) References Cited

U.S. PATENT DOCUMENTS

| | | | | |
|---|---|---|---|---|
| 9,166,322 | B2 * | 10/2015 | Glick | H01R 13/18 |
| 10,141,669 | B2 * | 11/2018 | Tyler | H01R 13/113 |
| 2010/0124857 | A1 * | 5/2010 | Kawamura | H01R 13/112 439/816 |
| 2010/0311286 | A1 | 12/2010 | Schrader | |
| 2014/0227915 | A1 | 8/2014 | Glick et al. | |
| 2018/0034171 | A1 | 2/2018 | Tyler | |
| 2018/0034178 | A1 * | 2/2018 | Tyler | H01R 13/62977 |
| 2018/0034219 | A1 * | 2/2018 | Tyler | H01R 13/447 |
| 2022/0140523 | A1 * | 5/2022 | Tyler | H01R 13/41 439/283 |

FOREIGN PATENT DOCUMENTS

| | | | | |
|---|---|---|---|---|
| CN | 215645120 | U * | 1/2022 | B60R 16/03 |
| DE | 102019121284 | A1 | 2/2021 | |
| EP | 3800746 | A1 | 4/2021 | |

* cited by examiner

RELEVANT ART

RELEVANT ART

RELEVANT ART

RELEVANT ART

RELEVANT ART

RELEVANT ART

RELEVANT ART

RELEVANT ART

RELEVANT ART

RELEVANT ART

RELEVANT ART

POWER CONNECTOR SYSTEM HAVING A RIGHT-ANGLE TYPE PLUG CONNECTOR OR A STRAIGHT TYPE PLUG CONNECTOR ENGAGEABLE WITH A HEADER CONNECTOR

CROSS-REFERENCE TO RELATED APPLICATION

This patent application claims priority to U.S. Provisional Patent Application No. 63/304,491 filed Jan. 28, 2022, which is hereby incorporated herein by reference in its entirety.

BACKGROUND OF THE INVENTION

A connector, which includes a header connector 1 and a plug connector 3, is as shown in U.S. Pat. No. 10,141,669 (and in FIGS. 1A, 1B, 1C, and 1D), and are to be mated with each other. At the mating end 5 (see FIG. 1C) of the plug connector 3 are tab terminals 7 (see FIGS. 1C and 1D), each of the tab terminals 7 having a leading edge to be mated with a header terminal 10 of the header connector 1 when mated to the plug connector 3. The header terminal 10 of the header connector 1 is connected to a component 13. The header terminal 10 can be seen through the mating end 18 (see FIG. 1B) of the header connector 1.

As more clearly seen in FIG. 1D, the header terminal 10 of the header connector 1 is in the form of a plurality of contact members that are arranged side-by-side in a stacked arrangement. Each of the contact members has a fork contact at a mating end thereof, each of the contact members having a pair of beams defining a socket (see U.S. Pat. No. 10,141,669) for accommodating therein a corresponding one of the tab terminals 7 of the plug connector 3. Each of the tab terminals 7 of the plug connector 3, which is attached to the header terminal 10 of the header connector 1, is connected to a wire or a cable 8, which is in turn connected to a component 11.

As further illustrated in FIG. 2A, the tab terminals 7 of the plug connector 3 mates with corresponding ones of the contact members that make up the header terminal 10 of the header connector 1; and, as described above, the contact members of the header terminal 10 are arranged side-by-side in a stacked arrangement. In addition to the contact members of the header terminal 10, in FIG. 2A, being arranged side-by-side in a stacked arrangement, a double interface is required in the conventional power connector system illustrated in FIG. 2A; i.e., the conventional header terminal 10 receives the tab terminal 7 of the conventional plug connector 3 at one end, and another tab terminal 9 of the conventional header connector 1 at the other end. As shown, for example, in FIGS. 2B and 2C, to achieve a right-angle type connection, it is required that the conventional header terminal 10 must receive the tab terminal 7 of the conventional right-angle type plug connector 3 and the tab terminal 9 of the conventional header connector 1 (i.e., a double interface connection). Furthermore, in the conventional power connector system shown in FIG. 2A, three separate components are needed, which increases electrical resistance in the conventional power connector system shown in FIGS. 1A-1D and 2A-2C.

The double interface connection and the requirement of three separate components are similarly needed in the conventional power connector system, as shown in FIGS. 2D and 2E. In FIG. 2D, the conventional header terminal 10 receives the tab terminal 7 from the conventional right-angle type plug connector 3 and further receives the tab terminal 9 from the conventional header connector 1. In FIG. 2E, the conventional header terminal 10 receives the tab terminal 7 from the conventional straight type plug connector 3 and further receives the tab terminal 9 from the conventional header connector 1. In either case, as in FIGS. 213 and 2C, the conventional power connector systems in FIGS. 2D and 2E require a double interface for its conventional conventional header terminal 10 and requires three separate components for its conventional header terminal 10 to receive, at one end thereof, the tab terminal 7 of a right-angle type plug connector or a straight type plug connector, and the straight type terminal 9 at an opposing end thereof. The above-discussed increased in parts or elements used in the above-described conventional power connector system, illustrated in FIGS. 1A-1D and 2A-2E, disadvantageously increases the resistance of the conventional power connector system.

FIGS. 3A and 3B illustrate another kind of conventional power connector system, wherein the header connecter has instead a male tab terminal 20, while the plug connector includes instead a female terminal 25, 35 for receiving the male tab terminal 20 of the header connector. Here, the female terminal 25 (see FIG. 3A) of the right-angle type plug connector and the female terminal 35 (see FIG. 3B) of the straight type plug connector are structurally different, thereby requiring multiple types of female terminals 25, 35 for the conventional plug connector. Also, in the right angle type plug connector shown in FIG. 3A, the female terminal 25 has outer holding members 27 and inner holding members 28. In the right-angle type plug connector, the outer holding members 27 are different, in structure or in number, from the inner holding members 28, as shown in FIG. 3A. Moreover, in the straight type plug connector, the female terminal 35 have outer holding members 37 and inner holding members 38. In the straight type plug connector, the outer holding members 37 similarly differ, in structure or in number, from the inner holding members 38, as shown in FIG. 3B.

In view of the above-discussed disadvantages or drawbacks in the structural arrangements of the conventional power connector systems, it is thus necessary to have a power connector system that allows for a single interface, unlike in the power connector system described in U.S. Pat. No. 10,141,669 (and in FIGS. 1A, 1B, 1C, and 1D) and the conventional power connector system described above with respect to FIGS. 3A and 3B where a double interface and multiple parts or elements are disadvantageously necessary to achieve their respective functions.

Also, it is necessary for the power connector system to have the same terminal in the plug connector to be used in both a right-angle type plug connector and in a straight type plug connector. That is, it is essential that the header connector be able to mate with the long edge or length side of the rectangular tab terminal (in a right-angle type plug connector) or with the short edge or width side of the rectangular tab terminal (in a straight type plug connector).

Furthermore, it is necessary to have a power connector system with two assembled components, not the three assembled components found in the conventional power connector systems, such as that shown in U.S. Pat. No. 10,141,669 (see also FIGS. 2A through 2E), and in FIGS. 3A and 3B. More particularly, the conventional power connector system, schematically shown in FIGS. 2B through 2E, requires a double interface (that is, the requirement of top and bottom portions of the female receiving terminal), as well as the requirement of at least three separate parts, to achieve a right-angle type or a straight type connection with its header and plug connectors.

SUMMARY OF THE INVENTION

A power connector system, which comprises a header connector (header device or the like), which can receive a right-angle type plug connector or a straight type plug connector. The right-angle plug connector is preferably a plug connector having a mating direction, which is 90 degrees from the centerline of a cable exiting from the plug connector. The straight type plug connector is a plug connector having a mating direction, which is parallel to the centerline of the cable exiting the back of the plug connector.

In a typical header connector, the typical header connector normally holds the male tab terminals. In this invention, however, the header connector holds a female receiving terminal or receptacle made of a high electrical conductivity material. The female receiving terminal or receptacle of this invention includes a plurality of fingers that extend parallel to and spaced apart from each other. The plurality of fingers extend from a joint member, and further provides a structural arrangement that acts as a reinforcement spring. Further, each of the fingers includes an independent reinforcement spring.

In a typical plug connector, the typical plug connector normally holds a female terminal. In this invention, however, the plug connector holds a male rectangular tab terminal, the male rectangular tab terminal having a short edge (or width side) and a long edge (or length side). Further in this invention, a female receiving terminal held in the header connector can mate with the short edge or width side of the male rectangular tab terminal when the header connector mates with a straight type plug connector. The female receiving terminal held in the header connector can mate with the long edge or length side of the male rectangular tab terminal when the header connector mates with a right-angle type plug connector. The other end of the male rectangular tab terminal includes a wire or a cable attached thereto via welding, mechanical crimp, or the like.

BRIEF DESCRIPTION OF THE DRAWINGS

FIG. 8 shows the mating side of the tight-angle type plug connector of this invention being in a direction perpendicular or 90 degrees to the direction along which the cables extend, while

FIG. 10 shows the mating side of the straight type plug connector of this invention being in a direction parallel or 180 degrees to the direction along which the cables extend, while

DETAILED DESCRIPTION OF THE PREFERRED EMBODIMENTS

Figure 1A:
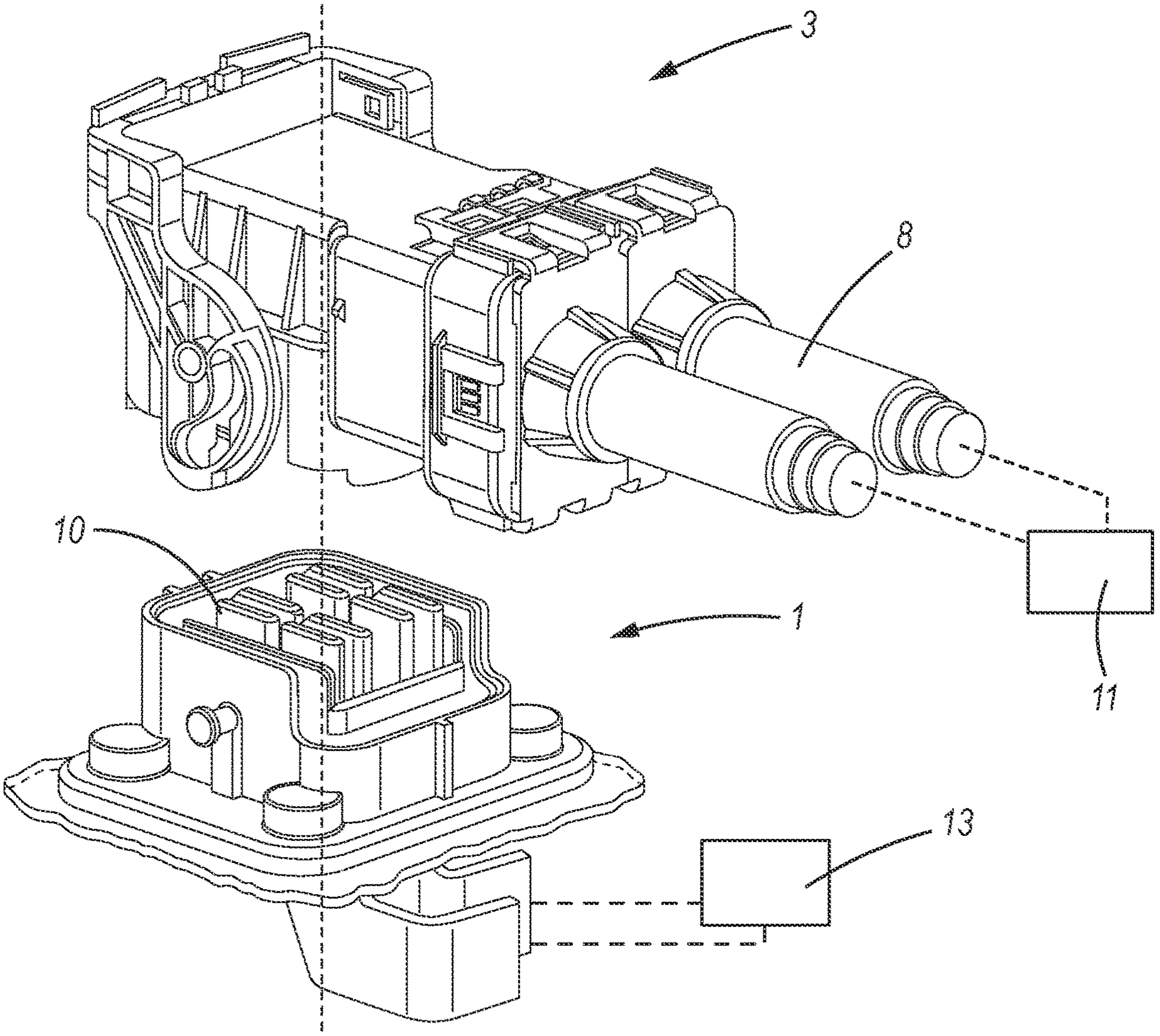
FIG. 1A is a conventional power connector system showing in perspective view a header connector containing female receiving terminals and a plug connector containing male tab terminals, the header connector and the plug connector of the conventional power connector system are shown to be ready for engagement or mating.
Figure 1B:
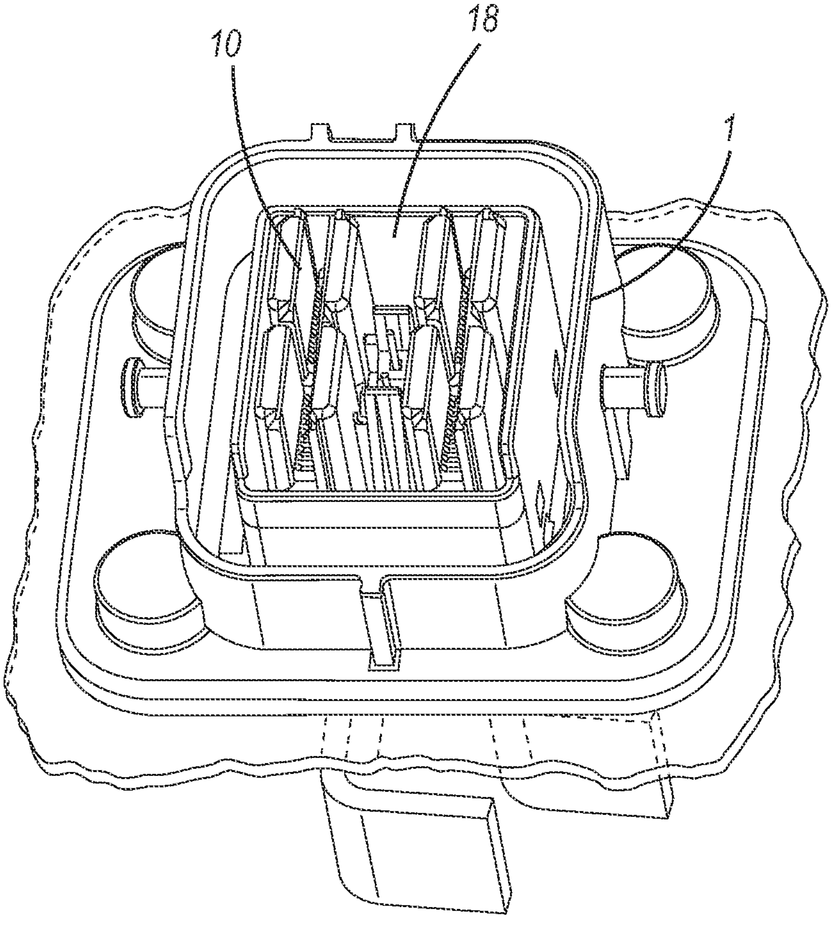
FIG. 1B is a perspective view of a mating side of the conventional header connector showing the female receiving terminals held therein.
Figure 1C:
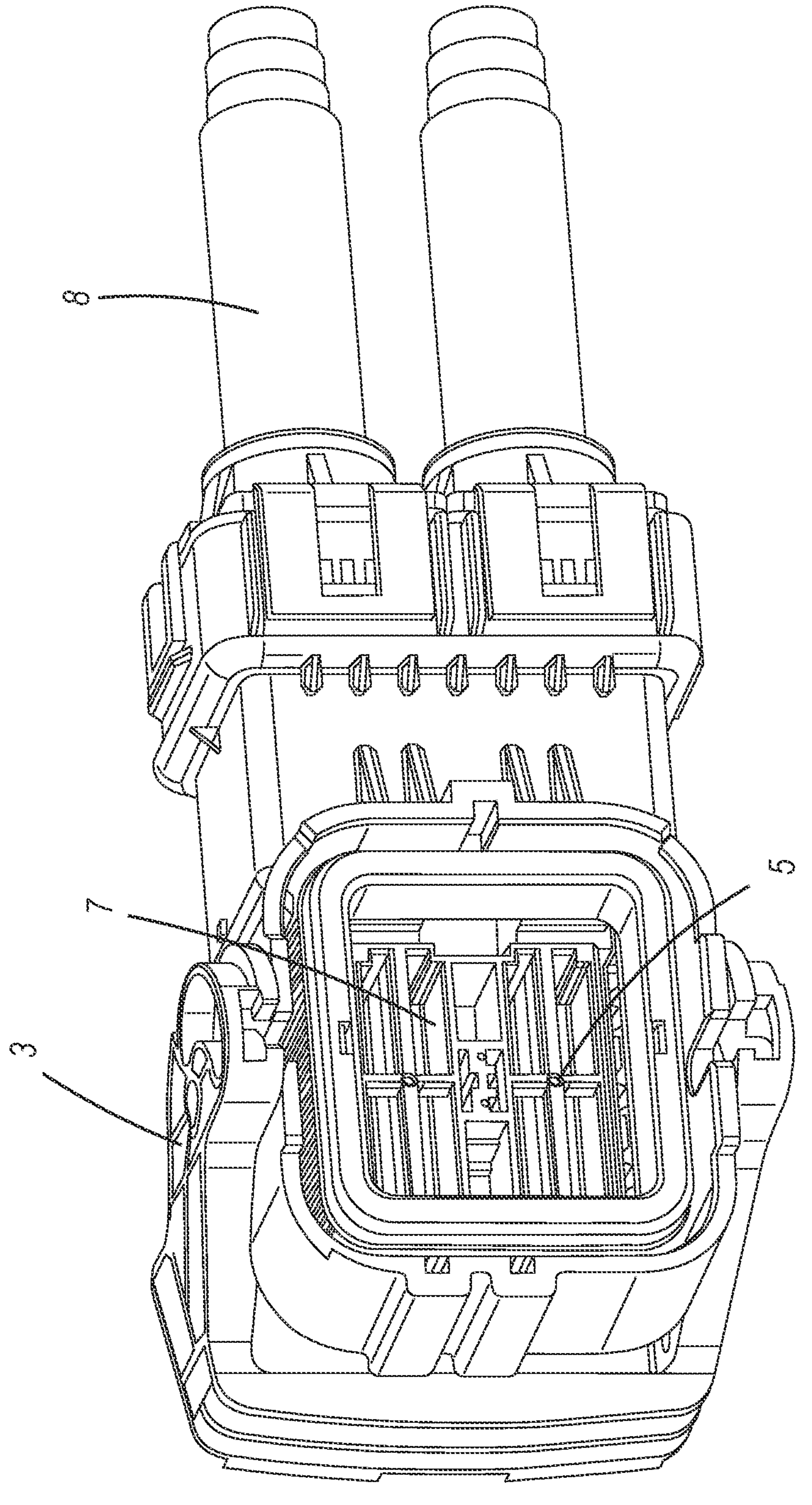
FIG. 1C is a perspective view of a mating side of the conventional plug connector showing the male tab terminals held therein.
Figure 1D:
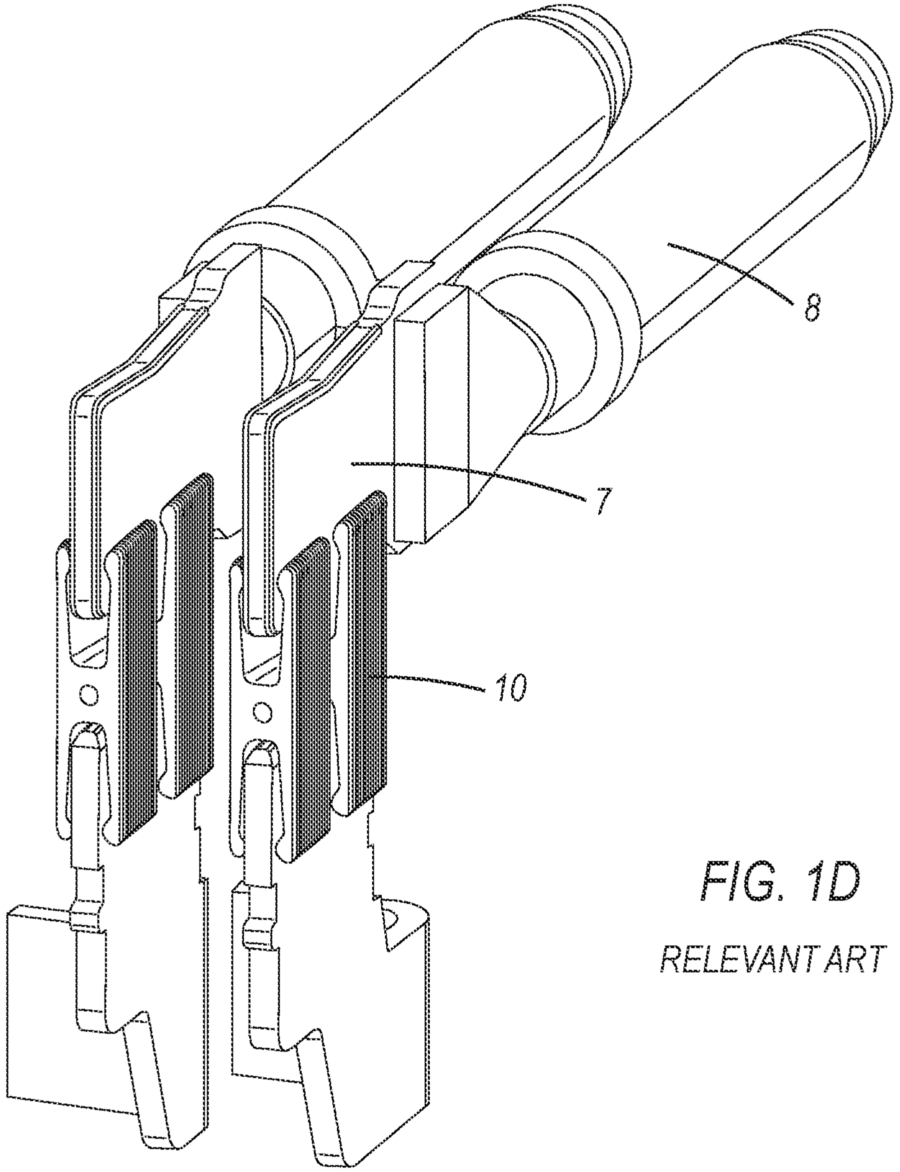
FIG. 1D shows the male tab terminals of the conventional plug connector engaged with the female terminals of the conventional header connector, while the other ends of the male tab terminals of the conventional plug connector are respectively connected to cables, and each of the female terminals is shown to be formed of a plurality of contact members that are arranged side-by-side in a stacked arrangement.
Figure 2A:
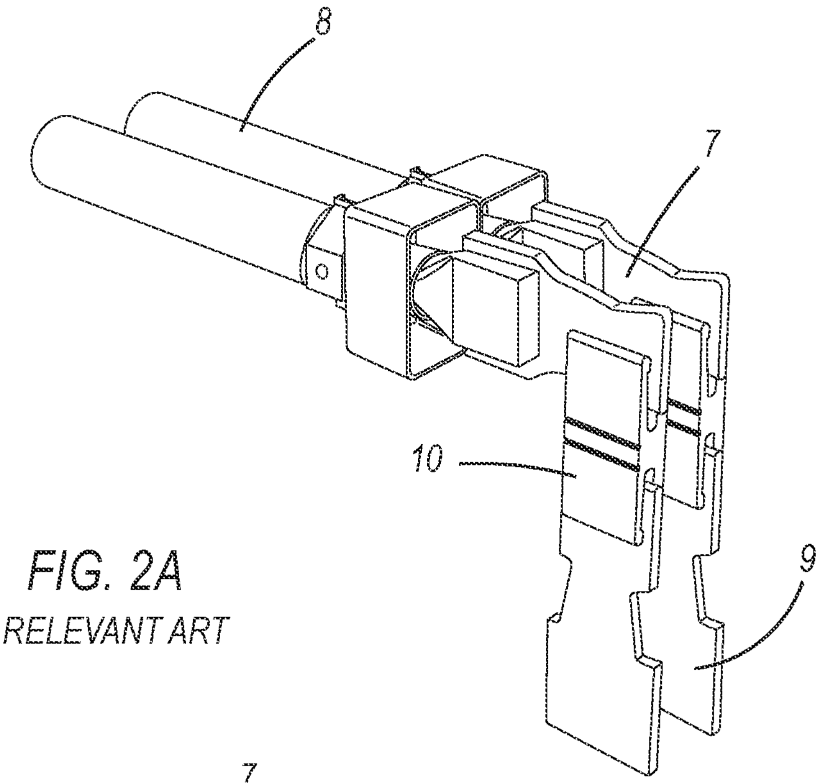
FIG. 2A illustrates, in perspective view, male tab terminals of the conventional right-angle type plug connector respectively engaged with female receiving terminals of the conventional header connector.
Figure 2B:
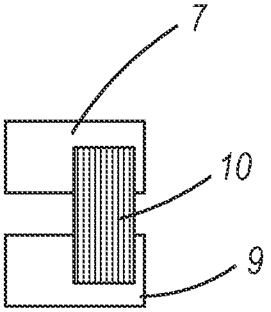
FIGS. 2B through 2E are schematic views of the conventional plug connector of FIG. 2A showing the requirement of a double interface and the use of at least three separate parts in order to achieve a right-angle type or straight type connection in the conventional power connector system.
Figure 2C:
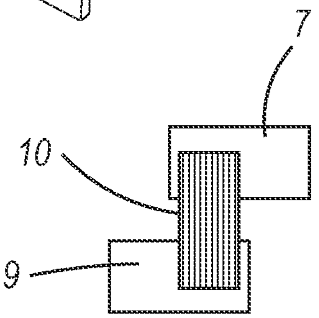
Figure 2D:
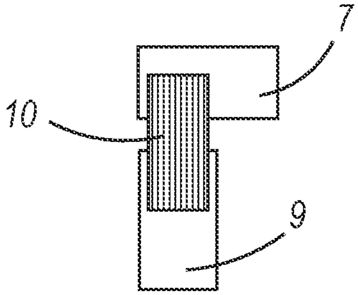
Figure 2E:
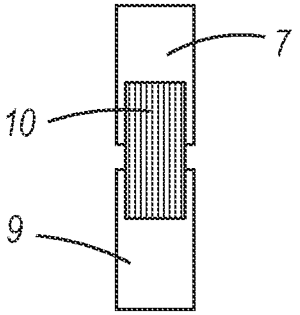
Figure 3A:
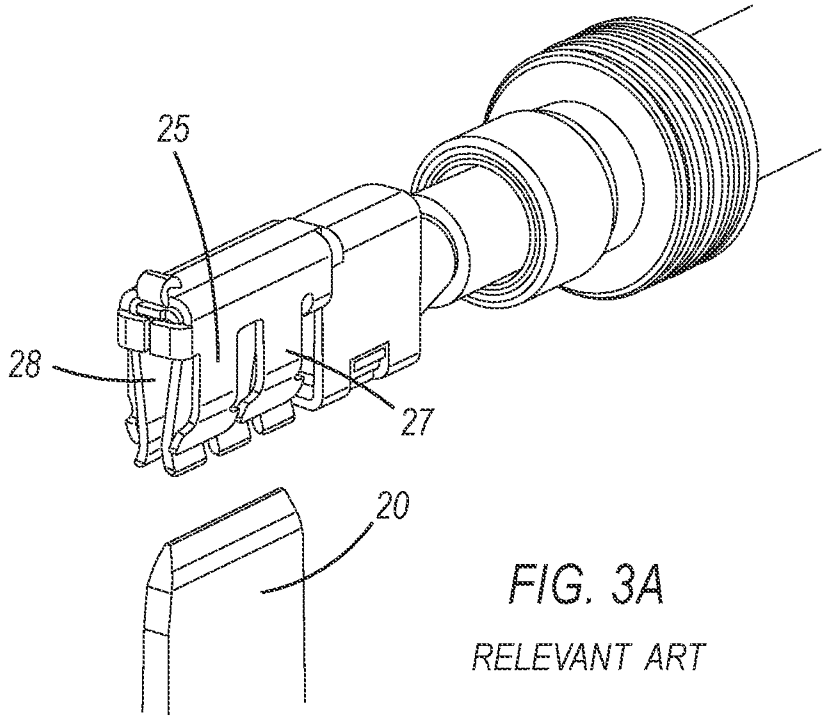
FIG. 3A is a male tab terminal to be held in another conventional header connector, and a female receiving terminal to be held in another conventional right-angle type plug connector, the male tab terminal of the another conventional header connector and the female receiving terminal of the another right-angle type plug connector being set to engage or mate together.
Figure 3B:
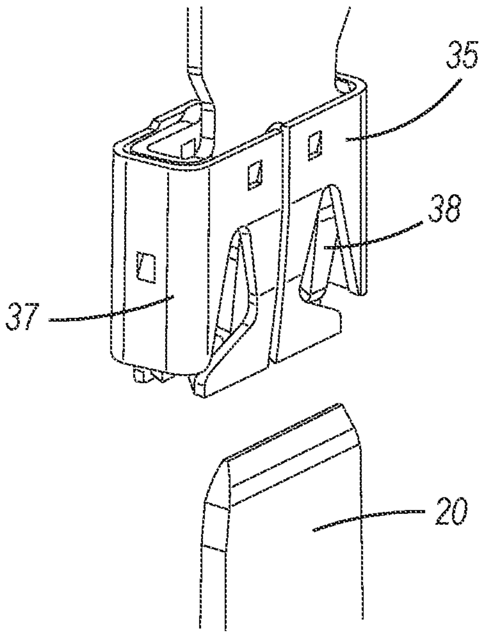
FIG. 3B is a male tab terminal to be held in another conventional header connector, and a female receiving terminal to be held in another conventional straight type plug connector, the male tab terminal of the another conventional header connector and the female receiving terminal of the another straight type plug connector being set to engage or mate together.
Figure 4:
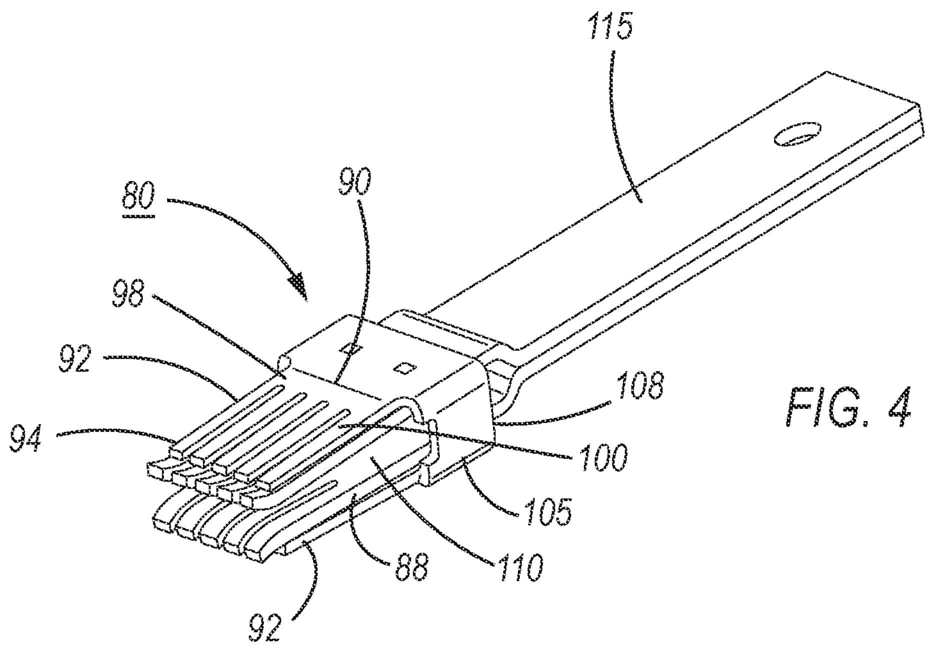
FIG. 4 is a perspective view showing the female receiving terminal of this invention to be held inside a header connector of this invention.

FIG. 4 illustrates, in a perspective view, a female receiving terminal, generally referred to as reference number 80. The female receiving terminal 80 includes a receiving end portion 88, which includes an outer member (or sheath) 90 and an inner member 110. The outer member (or sheath) 90 includes a plurality of outer fingers 92 that extend parallel to each other and are spaced apart from each other. The outer fingers 92 have free end portions 94 and a joint end portion 98 into which the other ends 100 of the outer fingers 92

(other than the free end portions 94 of the outer fingers 92) are joined. The joint end portion 98 is attached to a base end portion 105 having an end opening 108 into which the inner member 110 enters and is fitted into. The inner member 110 includes a bar-shaped member 115, which is connected inside a header connector 200 (see FIGS. 8 and 10). The female receiving terminal 80 consists of one cohesive element (i.e., its body and accompanying spring-reinforced fingers 92, 122), such that its receiving end is coaxial with the body of the terminal or whose mating end is 0 degree rotated from the body.

Figure 10:
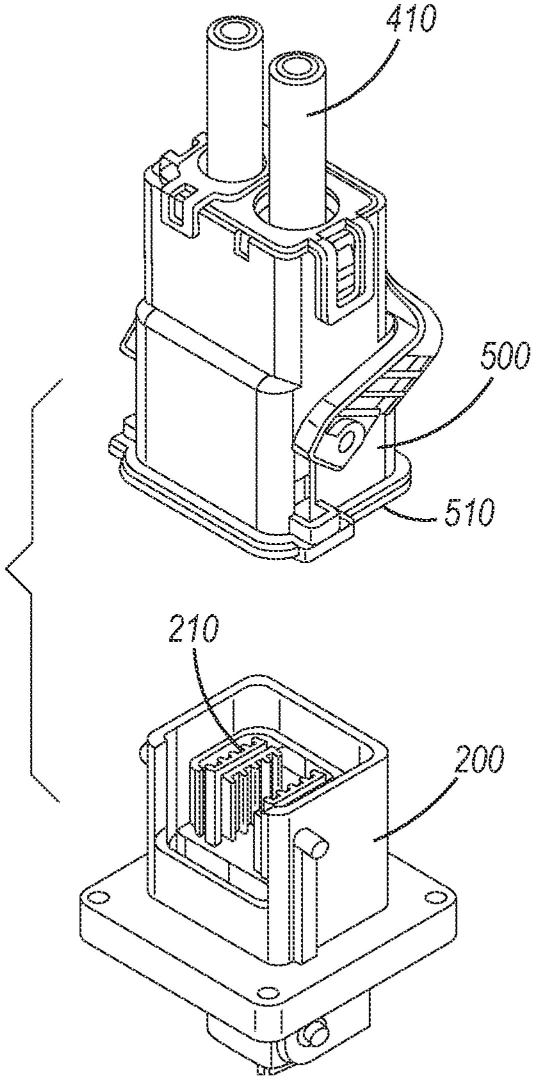
Figure 11:
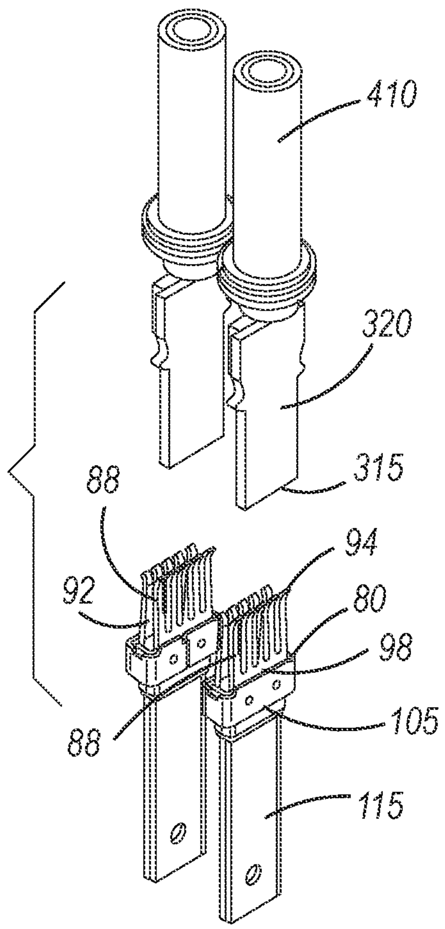
FIG. 11 shows the corresponding male tab rectangular terminals with the cables connected thereto, the short edge or the width side of each of the male tab rectangular terminals ready to be received by a corresponding one of the receiving female terminals of the header connector of this invention.

In this invention, the electrical resistance of the power connector system is low due to the minimized number of parts used. That is, for example, only a single female receiving terminal 80 (or a single set of a plurality of female receiving terminals 80) is used for either the right-angle type plug connector 300 (see FIG. 8) or the straight type plug connector 500 (see FIG. 10). Furthermore, a single type of header connector 200 (see FIGS. 8 and 10), with a single type of female receiving terminals 80 (see FIGS. 7A, 7B, 9, and 11), is used for either the right-angle type plug connector 300 (see FIG. 8) or the straight type plug connector 500 (FIG. 10). Thus, efficiency in assemblage of the power connector system of this invention is achieved; a reduction in electrical resistance in the power connector system of this invention is attained, and a reduction in the overall size of the power connector system of this invention is obtained.

Figure 5:
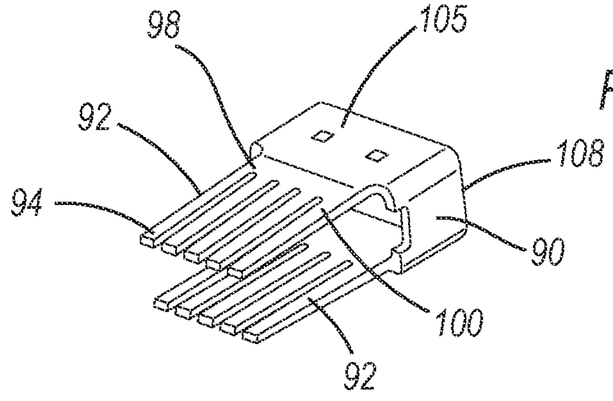
FIG. 5 is a perspective view of an outer member or sheath of the female receiving terminal of this invention.

Illustrated in FIG. 5 is the outer member (or sheath) 90, which includes the plurality of outer fingers 92 that extend parallel to each other and are spaced apart from each other. Each outer finger 92 is preferably straight when extending from the joint end portion 98. Connected to the joint end portion 98 is the base end portion 105. The base end portion 105 supports the flexible or resilient characteristics of the outer fingers 92, and can act as a spring reinforcement for the outer fingers 92. The outer fingers 92 can similarly support the flexible or resilient characteristics of the inner fingers 122, and can act as a spring reinforcement for the inner fingers 122. One end of the outer member (or sheath) 90 are the free end portions 94 of the outer fingers, while the opposite end of the outer member (or sheath) 90 is the end opening 108, which receives symmetrical upper fork-like member 130 and lower fork-like member 140 having the inner fingers 122 of the inner member 110, as shown in FIG. 6.

Figure 6:
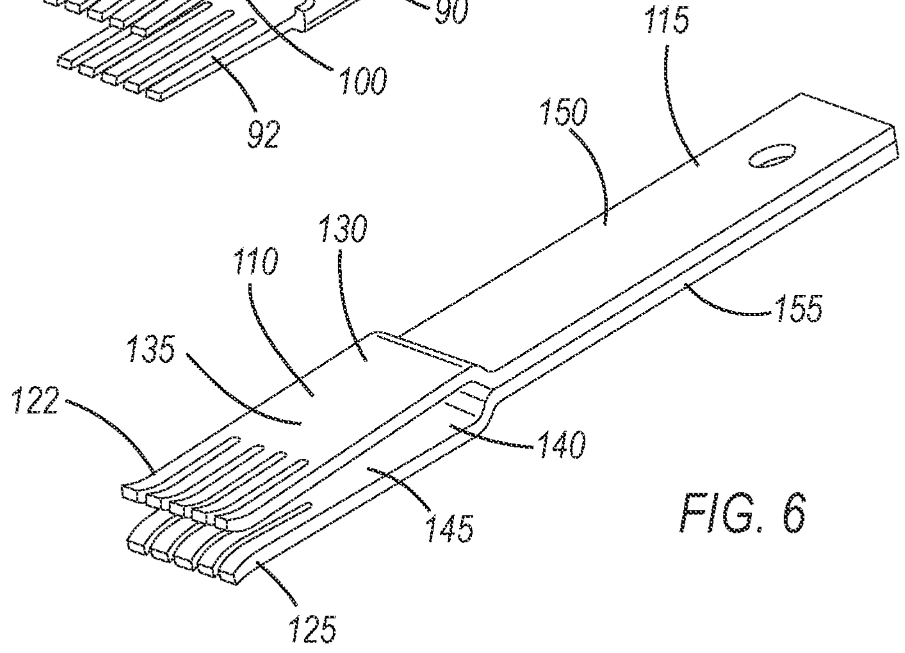
FIG. 6 is a perspective view of an inner member of the female receiving terminal of this invention.

In FIG. 6, the inner member 110 includes a plurality of inner fingers 122 at a receiving end 125 of the inner member 110 opposite the other end containing the bar-shaped member 115. The inner member 110 is composed of symmetrical upper fork-like member 130 and lower fork-like member 140 joined together, as illustrated in FIG. 6. Each set of fingers 122 in the upper fork-like member 130 extend from an upper intermediate member 135, while the set of fingers 122 in the lower fork-like member 140 extend from a lower intermediate member 145. Both the upper intermediate member 135 and the lower intermediate member 145 extend from their respective upper bar-like member 150 and lower bar-like member 155, both of which make up the bar-shaped member 115 that connects to a header connector 200 (see FIGS. 8 and 10).

Moreover, each of the outer fingers 92 and the inner fingers 122 has an independent reinforcement spring based on their physical structures and the manners in which they are structurally arranged with the joint member 98 and the base end portion 105 (see FIG. 5) or with the upper intermediate member 135 of the upper fork-like member 130 and the lower intermediate member 145 of the lower fork-like member 140 (see FIG. 6). The outer fingers 92 and the inner fingers 122 respectively abut with each other, such that each outer finger 92 has a corresponding abutting inner finger 122.

Although not limited thereto, the width and thickness of each of the outer fingers 92, which extends from the joint end portion 98, are substantially similar. Also, although not limited thereto, the width, thickness, and shape of the inner fingers 122, which respectively extend from the upper intermediate member 135 and the lower intermediate member 145 are substantially similar. As shown in FIG. 6, it is preferable, although the shape thereof is not limited thereto, that the receiving end 125 of each of the inner fingers 122 of the inner member 110 substantially curve upward.

Also, the outer fingers 92 and the inner fingers 122 also provide a double thickness for the receiving end portion 88, made of a high electrical conductive material, of the female receiving terminal 80, along with its spring-like and spring reinforced characteristics, thereby further advantageously reducing electrical resistance for the power connector system of this invention.

When assembled, as shown in FIG. 4, the inner fingers 122 of the inner member 110 extend past the free end portions 94 of the outer fingers 92 of the outer member or sheath 90. Also, when assembled, as shown in FIG. 4, when the inner fingers 122 move outward, upon receiving thereof the corresponding male tab terminals 310, 320 (see FIGS. 7A, 7B, 9, and 11), and pushed into the outer fingers 92, the outer fingers 92 are resilient to such movement, thereby providing resistance and reinforced spring-like function for the receiving end portion 88 of the female receiving terminal 80.

Figure 7A:
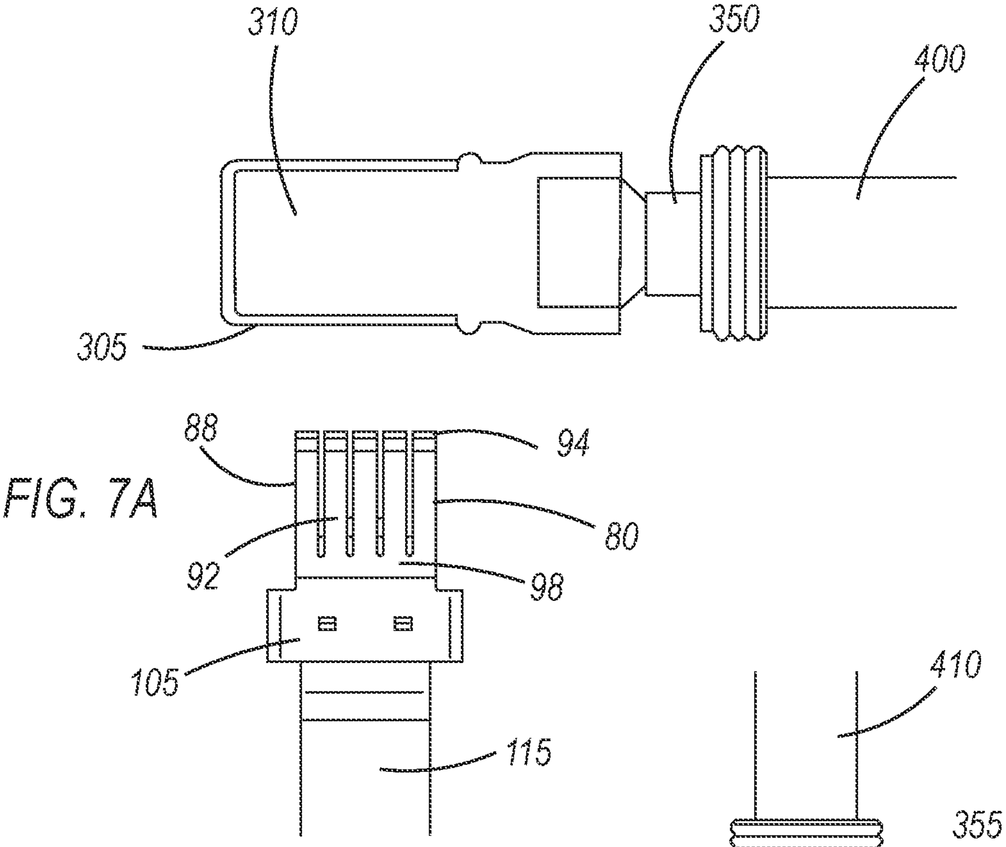
FIG. 7A illustrates the long edge or length side of the rectangular male terminal of a right-angle type plug connector of this invention ready to be received by and mate or engage with the female receiving terminal of a header connector of this invention.

FIG. 7A illustrates the long edge or length side 305 of the rectangular male terminal 310 of the right-angle type plug connector 300 (see FIG. 8) of this invention ready to be received by and mate or engage with the female receiving terminal 80 of the header connector 200 (see FIG. 8) of this invention. More particularly, the rectangular male terminal 310 is received by the receiving end portion 88 of the female receiving terminal 80, That is, the free end portions 94 of the fingers 92 of the female receiving terminal 80 receive therein the rectangular male terminal 310 with the long edge or length side 305 of the rectangular male terminal 310 being led into the plurality of fingers 92 of the female receiving terminal 80 held within the header connector 200 (see FIG. 8).

Figure 8:
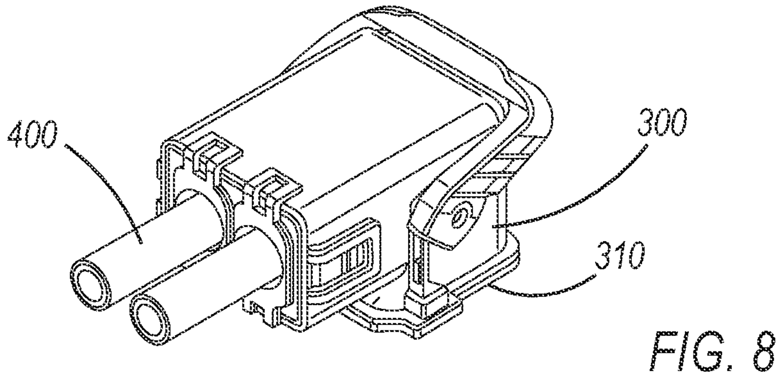
Figure 9:
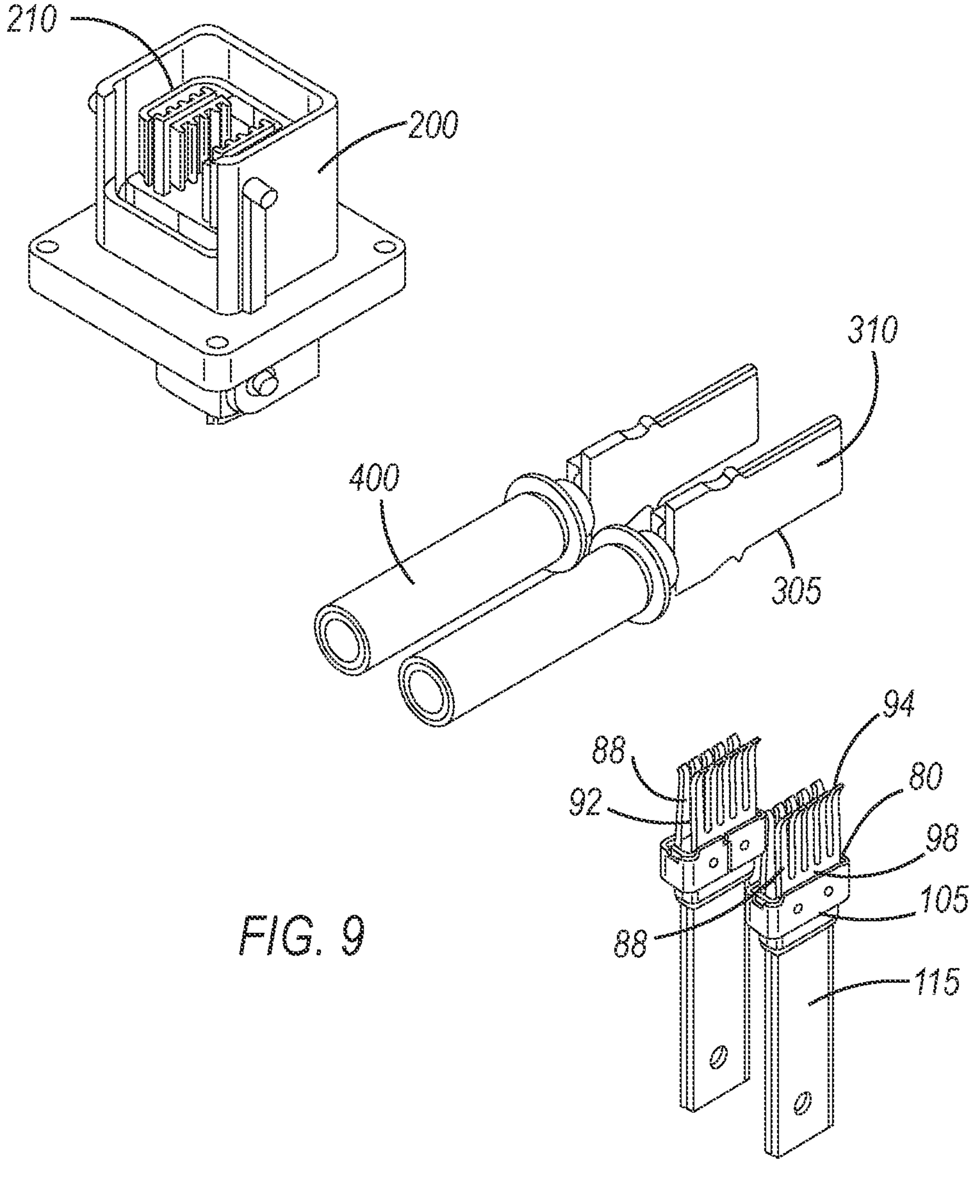
FIG. 9 shows the corresponding male tab rectangular terminals with the cables connected thereto, the long edge or the length side of each of the male tab rectangular terminals ready to be received by a corresponding one of the receiving female terminals of the header connector of this invention.

Also shown in FIG. 7A is a cable 400 attached to one end 350 of the rectangular male terminal 310, which is held inside the right-angle type plug member 300 (see FIG. 8), and the bar-shaped member 115 of the female receiving terminal 80, which is connected inside the header connector 200 (see FIG. 8).

Figure 7B:
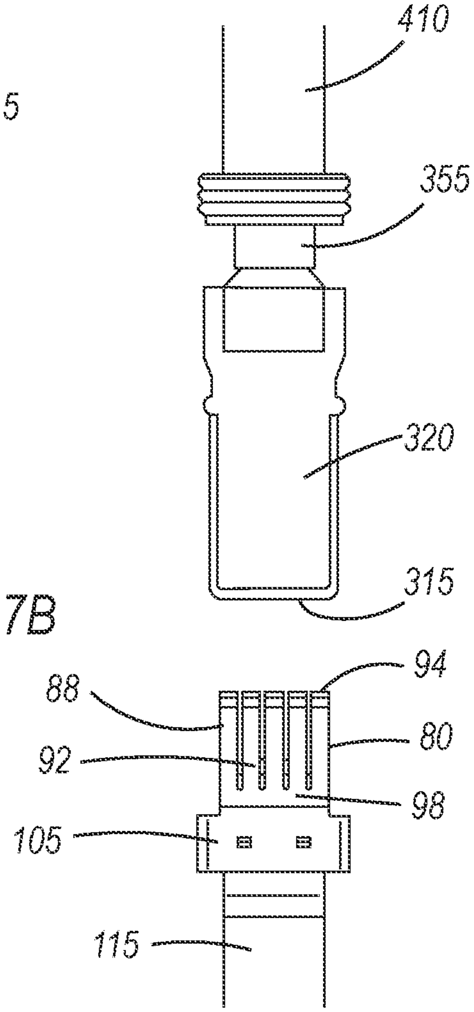
FIG. 7B illustrates the short edge or width side of the rectangular male terminal of a straight type plug connector of this invention ready to be received by and mate or engage with the female receiving terminal of a header connector of this invention.

FIG. 7B illustrates a short edge or width side 315 of a rectangular male terminal 320 of a straight type plug connector 500 (see FIG. 10) of this invention ready to be received by and mate or engage with the female receiving terminal 80 of the header connector 200 (see FIG. 10) of this invention. More particularly, the rectangular male terminal 320 is received by the receiving end portion 88 of the female receiving terminal 80. That is, the free end portions 94 of the fingers 92 of the female receiving terminal 80 receive therein the rectangular male terminal 320 with the short edge or width side 315 of the rectangular male terminal 320 being led into the plurality of fingers 92 of the female receiving terminal 80 held within the header connector 200 (see FIG. 10).

Also shown in FIG. 7B is a cable 410 attached to one end 355 of the rectangular male terminal 320, which is held inside the straight type plug member 500 (see FIG. 10), and the bar-shaped member 115 of the female receiving terminal 80, which is connected inside the header connector 200 (see FIG. 10).

It is to be noted that the header connector 200, as shown in either FIG. 8 or FIG. 10, can receive either the rectangular male terminal 310 (see FIG. 7A) held by the right-angle type plug connector 300 (see FIG. 8) or the rectangular male terminal 320 (see FIG. 7B) held by the straight type plug connector 500 (see FIG. 10).

Also, alternatively, the rectangular male terminal 310 (see FIGS. 7A and 9), which is attached to the cable 400, held within the right-angle type plug connector 300 (see FIG. 8) may be similar to the rectangular male terminal 320 (see FIGS. 7B and 10), which is attached to the cable 410, held within the straight type plug connector 500 (see FIG. 10).

In this invention, as illustrated in FIGS. 7A, 7B, 9, and 11, a single male tab terminal 310, 320 may be used for the right-angle type plug connector 300 (see FIG. 8) or the straight type plug connector 500 (see FIG. 10). Thus, no additional male tab terminal (or element, s as, a bridge or a tab socket) is necessary for use in the right-angle type plug connector 300 and the straight type plug connector 500, thereby one interface is realized for the entire power connector system of this invention. The minimizing of the number of parts or elements of the power connector system of this invention advantageously decreases electrical resistance of the system.

Furthermore, the minimizing of the number of parts or elements of the power connector system of this invention is achieved by the use of a single (or single type) male tab terminal 310, 320 (see FIGS. 7A, 7B, 9, and 11) for the right-angle type plug connector 300 (see FIG. 8) or the straight type plug connector 500 (see FIG. 10), thereby providing efficiency in the assemblage of the power connector system of this invention.

Moreover, in FIGS. 7A, 7B, 9, and 11, another end of the rectangular male terminal (or male rectangular tab terminal) 310, 320 may include a wire or a cable 400, 410 attached thereto via welding, mechanical crimp, or the like.

The present invention is not limited to the above-described embodiments; and various modifications in design, structural arrangement or the like may be used without departing from the scope or equivalents of the present invention. For example, each of the right-angle type plug connector 300 or the straight type plug connector 500 may hold one or more male tab terminal(s) 310, 320. Similary, the header connector 200 may hold one or more female receiving terminal(s) 80.

We claim:

1. A power connector system, comprising:

a right-angle type plug connector having therein a least a male rectangular tab terminal; and a header connector having therein at least a female receiving terminal, wherein said female receiving terminal includes, at a mating end thereof, a plurality of fingers that extend parallel to and spaced apart from each other, wherein said fingers are comprised of first fingers and second fingers, said second fingers contained within said first fingers.

2. The power connector system according to claim 1, wherein said male rectangular tab terminal has a short edge or width side, and a long edge or length side.

3. The power connector system according to claim 2, wherein, when said right-angle type plug connector engages or mates with said header connector, said female receiving terminal receives said long edge or length side of said male rectangular tab terminal when said female receiving terminal receives said male rectangular tab terminal during engagement or mating thereof.

4. The power connector system according to claim 1, wherein said fingers of said female receiving terminal are comprised of said first fingers of an outer member or sheath that are spaced apart from each other and extend parallel to each other, and said second fingers of an inner member that are spaced apart from each other and extend parallel to each other, and wherein said first fingers and said second fingers join together to form said fingers of said female receiving terminal for resiliently engaging or mating with said male rectangular tab terminal of said right-angle type plug connector.

5. The power connector system according to claim 4, wherein said first fingers extend from a joint member of said outer member or sheath, and said second fingers extend from a joint member of said inner member.

6. The power connector system according to claim 5, wherein said joint member of said outer member or sheath is connected to a reinforcement spring.

7. A power connector system, comprising:

a straight type plug connector having therein a least a male rectangular tab terminal; and a header connector having therein at least a female receiving terminal, wherein said female receiving terminal includes, at a mating end thereof, a plurality of fingers that extend parallel to and spaced apart from each other, wherein said fingers are comprised of first fingers and second fingers, said second fingers contained within said first fingers.

8. The power connector system according to claim 7, wherein said male rectangular tab terminal has a short edge or width side, and a long edge or length side.

9. The power connector system according to claim 8, wherein, when said straight type plug connector engages or mates with said header connector, said female receiving terminal receives said short edge or width side of said male rectangular tab terminal when said female receiving terminal receives said male rectangular tab terminal during engagement or mating thereof.

10. The power connector system according to claim 7, wherein said fingers of said female receiving terminal are comprised of said first fingers of an outer member or sheath that are spaced apart from each other and extend parallel to each other, and said second fingers of an inner member that are spaced apart from each other and extend parallel to each other, and wherein said first fingers and said second fingers join together to form said fingers of said female receiving terminal for resiliently engaging or mating with said male rectangular tab terminal of said straight type plug connector.

11. The power connector system according to claim 10, wherein said first fingers extend from a joint member of said outer member or sheath, and said second fingers extend from a joint member of said inner member.

12. The power connector system according to claim 11, wherein said joint member of said outer member or sheath is connected to a reinforcement spring.

13. The power connector system according to claim 11, wherein each of said fingers includes an independent reinforcement spring.

14. A power connector system, comprising:

a plug connector having therein a least a male rectangular tab terminal, wherein said plug connector is one of right-angle type plug connector and a straight type plug connector; and a header connector having therein at least a female receiving terminal, wherein said female receiving terminal includes, at a mating end thereof, a plurality of fingers that extend parallel to and spaced apart from each other, wherein said fingers are comprised of first fingers and second fingers, said second fingers contained within said first fingers.

15. The power connector system according to claim 14, wherein said male rectangular tab terminal has a short edge or width side, and a long edge or length side.

16. The power connector system according to claim 15, wherein, when said right-angle type plug connector engages or mates with said header connector, said female receiving terminal receives said long edge or length side of said male rectangular tab terminal when said female receiving terminal of said header connector receives said male rectangular tab terminal during engagement or mating thereof, and wherein, when said straight type plug connector engages or mates with said header connector, said female receiving terminal receives said short edge or width side of said male rectangular tab terminal when said female receiving terminal of said header connector receives said male rectangular tab terminal during engagement or mating thereof.

17. The power connector system according to claim 15, wherein said first fingers extend from a joint member of said outer member or sheath, and said second fingers extend from a joint member of said inner member.

18. The power connector system according to claim 17, wherein said joint member of said outer member or sheath is connected to a reinforcement spring.

19. The power connector system according to claim 17, wherein each of said fingers includes an independent reinforcement spring.

20. The power connector system according to claim 14, wherein said fingers of said female receiving terminal are comprised of said first fingers of an outer member or sheath that are spaced apart from each other and extend parallel to each other, and said second fingers of an inner member that are spaced apart from each other and extend parallel to each other, and wherein said first fingers and said second fingers join together to form said fingers of said female receiving terminal of said header connector for resiliently engaging or mating with said male rectangular tab terminal of said plug connector.

* * * * *